United States Patent
Kokojima et al.

(10) Patent No.: US 7,414,636 B2
(45) Date of Patent: Aug. 19, 2008

(54) RENDERING APPARATUS, RENDERING PROCESSING METHOD AND COMPUTER PROGRAM PRODUCT

(75) Inventors: Yoshiyuki Kokojima, Yokohama (JP); Yosuke Bando, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 11/147,326

(22) Filed: Jun. 8, 2005

(65) Prior Publication Data
US 2005/0275663 A1    Dec. 15, 2005

(30) Foreign Application Priority Data
Jun. 9, 2004    (JP)    ............... 2004-171258

(51) Int. Cl.
*G06G 5/00*    (2006.01)
(52) U.S. Cl. ...................... 345/622; 345/619
(58) Field of Classification Search .............. 345/622, 345/619
See application file for complete search history.

(56) References Cited

U.S. PATENT DOCUMENTS

| | | | |
|---|---|---|---|
| 5,757,321 A * | 5/1998 | Billyard | 345/426 |
| 6,072,505 A * | 6/2000 | Piazza et al. | 345/501 |
| 6,504,542 B1 | 1/2003 | Voorhies et al. | |
| 6,765,575 B1 * | 7/2004 | Voorhies et al. | 345/441 |
| 7,050,055 B2 * | 5/2006 | Lindholm et al. | 345/426 |
| 2002/0196251 A1 * | 12/2002 | Duluk et al. | 345/420 |
| 2005/0134583 A1 * | 6/2005 | Kokojima et al. | 345/419 |

OTHER PUBLICATIONS

Marc Olano, et al., "Triangle Scan Conversion using 2D Homogeneous Coordinates", SIGGRAPH/eurographics Workshop, 1997, pp. 89-95.

* cited by examiner

*Primary Examiner*—Motilewa Good-Johnson
(74) *Attorney, Agent, or Firm*—Oblon, Spivak, McClelland, Maier & Neustadt, P.C.

(57) ABSTRACT

A setup section acquires vertex data including at least homogeneous coordinate and window coordinate relevant to two vertexes of rendering primitive, that is, segment. An edge coefficient calculation unit calculates an edge coefficient used for determining whether or not a pixel exists inside a projection area (parallelogram) of the segment. A bounding box calculation unit calculates a bounding box of the projection area from at least one vertex data of two vertexes and the edge coefficient. A start point determination unit classifies the projection area based on a combination of the edge coefficient, and determines scan start point and scan performing direction of the bounding box in accordance with the classification. An edge function initial value determination unit determines an edge function of the pixel corresponding to the scan start point as an initial value, and carries out a DDA, and thereby, generates setup data for rasterizing.

18 Claims, 16 Drawing Sheets

Homogenous coordinate : x, y, z, w
Color : R, G, B, A
Texture coordinate : s, t, r, q
Fog : f
Normal vector : Nx, Ny, Nz Perspective projection matrix $$\begin{pmatrix} 2n/(r-l) & 0 & (r+l)/(r-l) & 0 \\ 0 & 2n/(t-b) & (t+b)/(t-b) & 0 \\ 0 & 0 & -(f+n)/(f-n) & -2nf/(f-n) \\ 0 & 0 & -1 & 0 \end{pmatrix}$$

Orthographic projection matrix $$\begin{pmatrix} 2/(r-l) & 0 & 0 & (r+l)/(r-l) \\ 0 & 2/(t-b) & 0 & (t+b)/(t-b) \\ 0 & 0 & -2/(f-n) & (f+n)/(f-n) \\ 0 & 0 & 0 & 1 \end{pmatrix}$$

(l,b,−n): Coordinate at lower left corner on neighboring clip plane
(r,t,−n): Coordinate at upper right corner on neighboring clip plane
n: Distance from viewpoint to neighboring clip plane
f: Distance from viewpoint to far clip plane Viewpoint transformation matrix $$\begin{pmatrix} Va/S_m & 0 & 0 & (Vb-W/2)/S_m \\ 0 & Vc/S_m & 0 & (Vd-H/2)/S_m \\ 0 & 0 & Ve & Vf \\ 0 & 0 & 0 & 1 \end{pmatrix}$$

W,H: Width and height of viewpoint
Va,Vb: Arbitrary number for determining X-direction range of viewpoint
Vc,Vd: Arbitrary number for determining Y-direction range of viewpoint
Ve,Vf: Arbitrary number for determining depth buffer range
$S_m$: Half value of maximum screen size

F I G. 4

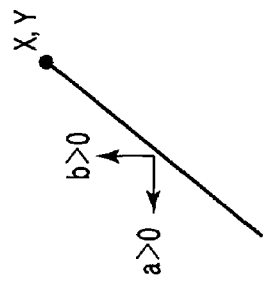
FIG. 8A Update Xmax and Ymax (a<0, b>0)
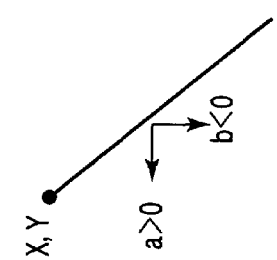
FIG. 8B Update Xmin and Ymax (a<0, b<0)
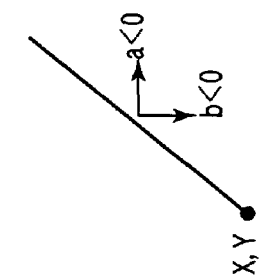
FIG. 8C Update Xmin and Ymin (a>0, b<0)
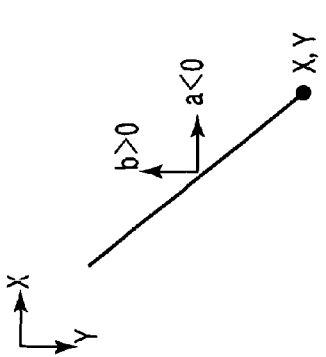
FIG. 8D Update Xmax and Ymin (a>0, b>0)
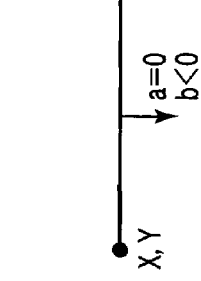
FIG. 8E Update Xmin and Ymin (a>0, b=0)
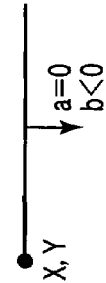
FIG. 8F Update Xmax and Ymax (a<0, b=0)
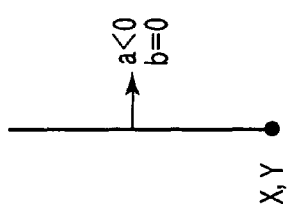
FIG. 8G Update Xmax and Ymax (a=0, b>0)
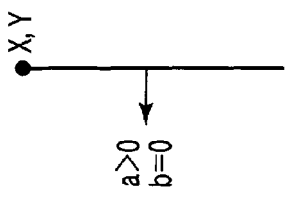
FIG. 8H Update Xmin and Ymin (a=0, b<0)

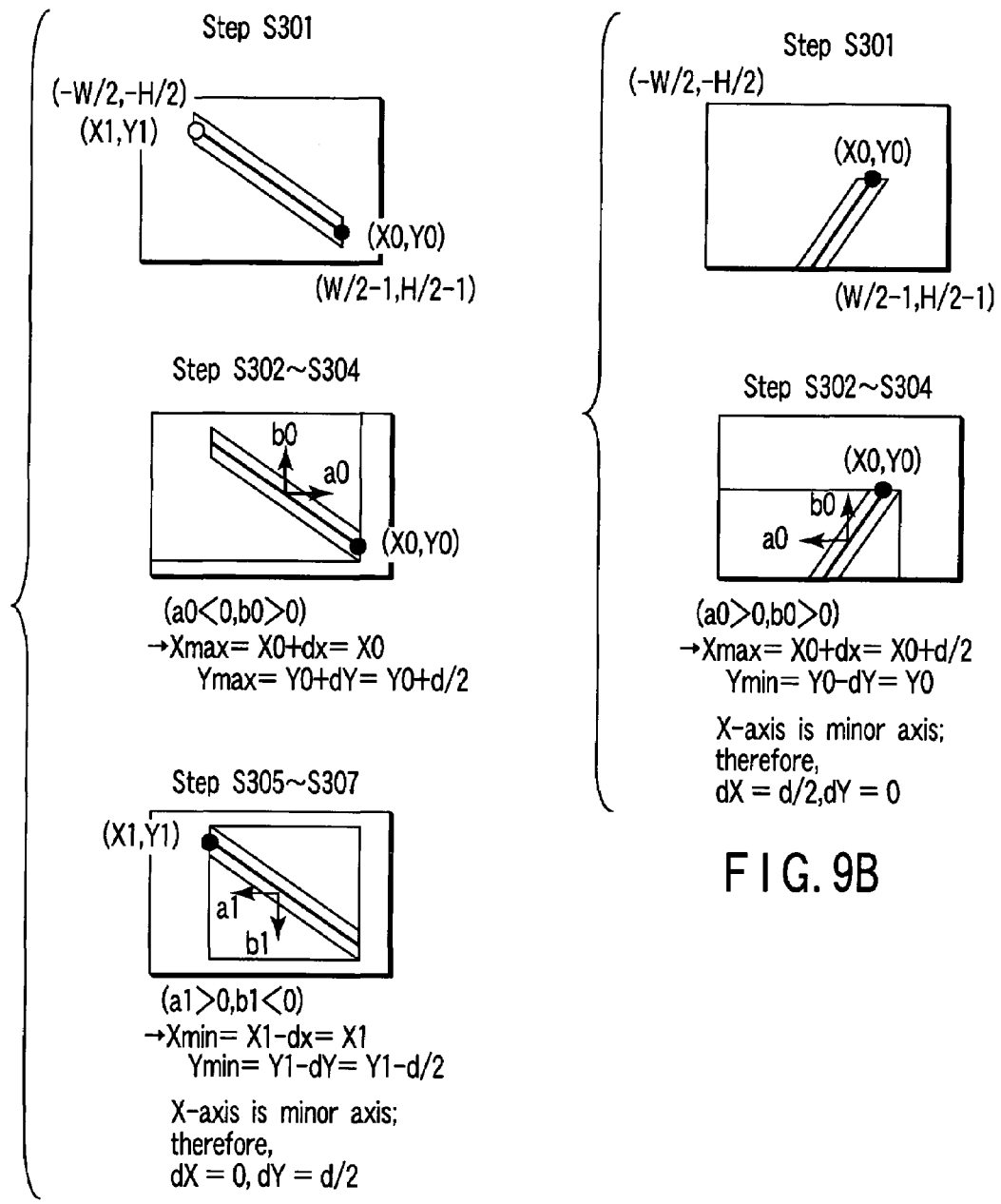

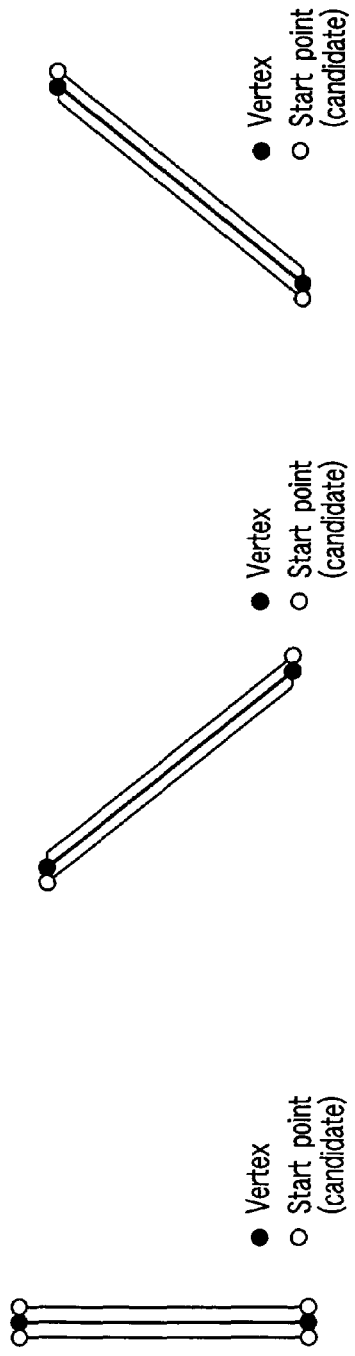
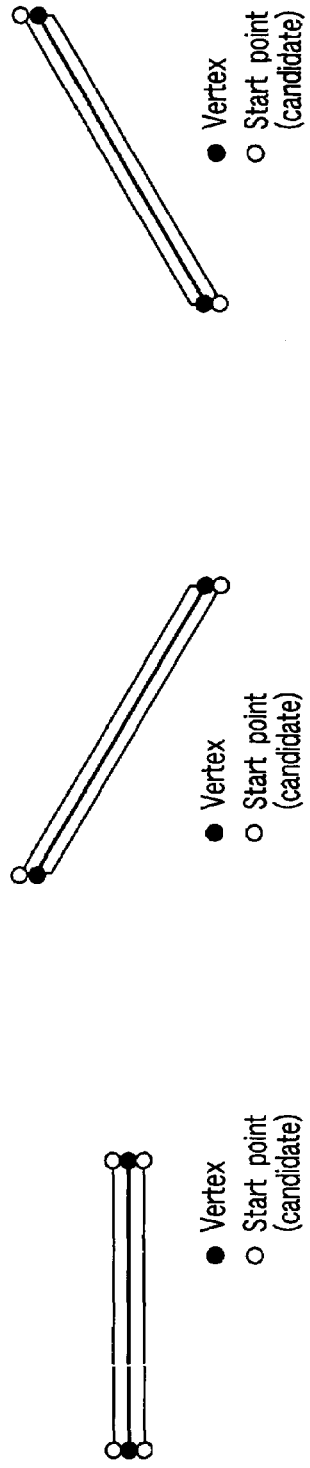
FIG. 10A, FIG. 10B, FIG. 10C, FIG. 10D, FIG. 10E, FIG. 10F
● Vertex
○ Start point (candidate)

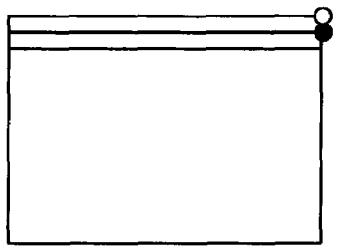
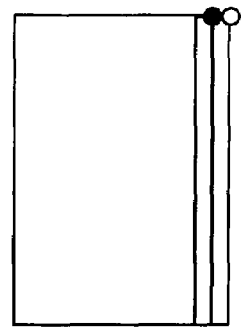
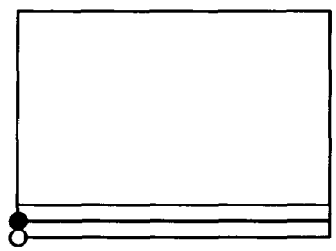
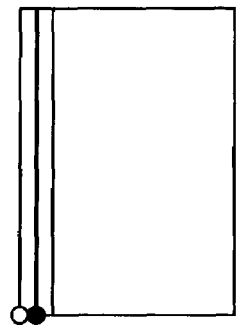
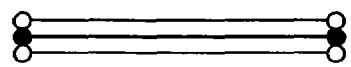
F I G. 11

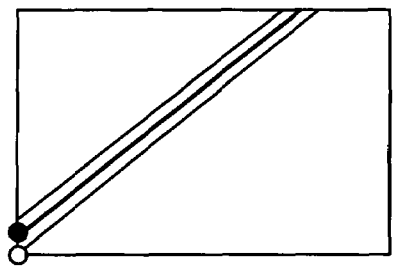
Minor axis: X-axis
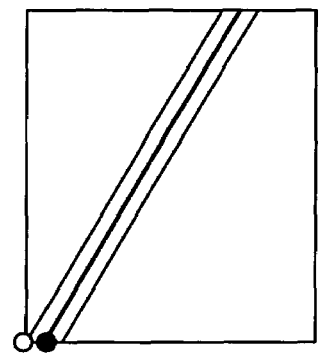
Minor axis: Y-axis
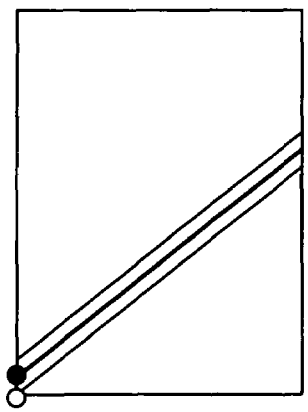
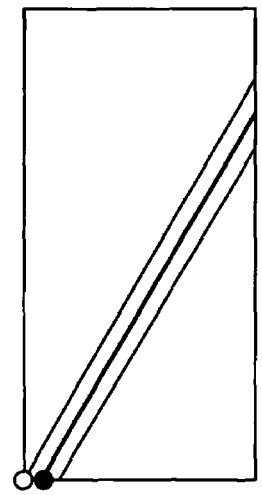
● Vertex
○ Start point (candidate)
FIG. 13

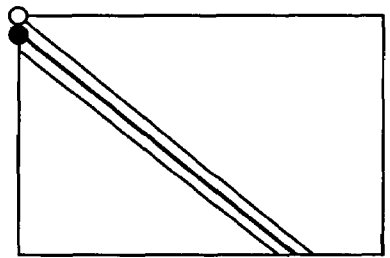
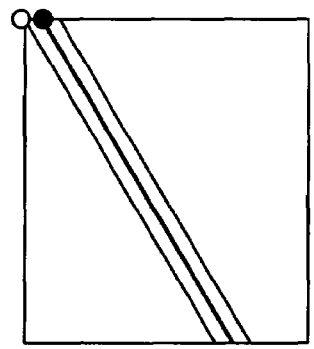
Minor axis : X-axis
Minor axis : Y-axis
● Vertex
○ Start point (candidate)
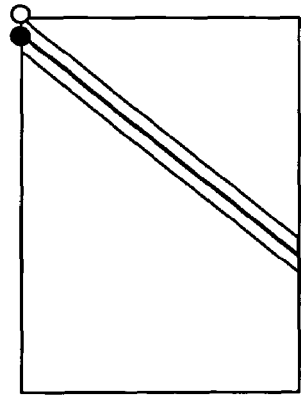
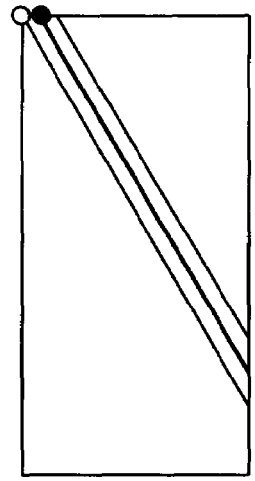
F I G. 15

RENDERING APPARATUS, RENDERING PROCESSING METHOD AND COMPUTER PROGRAM PRODUCT

CROSS-REFERENCE TO RELATED APPLICATIONS

This application is based upon and claims the benefit of priority from prior Japanese Patent Application No. 2004-171258, filed Jun. 9, 2004, the entire contents of which are incorporated herein by reference.

BACKGROUND OF THE INVENTION

1. Field of the Invention

The present invention relates to rendering apparatus (engine), rendering processing method and computer program product, which carry out rendering processing of a three-dimensional computer graphics (three-dimensional (3-D) CG) image. In particular, the present invention relates to rasterizing if rendering primitive includes a segment having a vertex existing backwardly from the viewpoint.

2. Description of the Related Art

Three-dimensional CG is a technique of representing and arranging various objects in a computer virtual three-dimensional space by modeling, and drawing how these objects are seen from viewpoints set in the space in a two-dimensional screen.

In particular, the technique of drawing objects in the two-dimensional screen calls rendering. The rendering includes various processings described below. Specifically, the processings are setting of viewpoint and light source, predetermined coordinate transformation, hidden-surface elimination, shadowing, viewport conversion, anti-aliasing, etc. A processor (engine), which carries out the foregoing rendering at high speed and drawing an image in real time, calls a real-time CG processor (engine).

According to the foregoing rendering, it must be determined whether or not a pixel to be drawn exists inside rendering primitive. Thus, in order to express the shape of the rendering primitive with a linear function couple, the following calculation is made.

For example, if rendering primitive is a triangle, the shape of the triangle is expressed using three linear functions shown in the following equation (1).

$$A0(X, Y) = a0 \times (X - X0) + b0 \times (Y - Y0)$$
$$A1(X, Y) = a1 \times (X - X1) + b1 \times (Y - Y1)$$
$$A2(X, Y) = a2 \times (X - X2) + b0 \times (Y - Y2) \quad (1)$$

Where (X, Y): pixel window coordinate (i.e., coordinate on two-dimensional coordinate system set in viewport (X0, Y0), (X1, Y1), (X2, Y2): window coordinate of the vertex of the triangle a0, b0, a1, b1, a2, b2: constant The foregoing linear functions call an edge function, and the pixel on a viewport (graphic area) is classified into three areas, that is, inside, side and outside of the triangle. In this case, the pixel having an edge function value larger than 0 means that it exists inside the triangle. The pixel having an edge function value equal to 0 means that it exists on the side of the triangle. The pixel having an edge function value smaller than 0 implies that it exists outside the triangle.

Therefore, in rasterizing, it is determined whether or not the edge function values on three sides are all large than 0. By doing so, it is determined whether or not the pixel exists inside the triangle. Incidentally, coefficients a0, b0, a1, b1, a2 and b2 are calculated using the following equation (2).

$$a0 = Y0 - Y1$$
$$b0 = X1 - X0$$
$$a1 = Y1 - Y2$$
$$b1 = X2 - X1$$
$$a2 = Y2 - Y0$$
$$b2 = X0 - Y2 \quad (2)$$

In this case, the vertex (X0, Y0), (X1, Y1), (X2, Y2) of the triangle is arranged on the viewport in the counterclockwise direction.

In order to load the foregoing calculation procedures to hardware, a method calling DDA (Digital Differential Analysis) is often employed. According to the DDA, only initial value of the edge function in a start pixel is calculated using the equation (1). The foregoing coefficients a0, b0, a1, b1, a2 and b2 of the edge function are successively added to the initial value. In this manner, edge function values of neighboring pixels are obtained. Moreover, the DDA is often used for the procedure of interpolating a vertex parameter to calculate a pixel parameter. The contents of the DDA are as follows.

First, a parameter initial value in the start pixel (X, Y) is calculated using the following parameter function equation (3).

$$P(X, Y) = a \times X + b \times Y + c \quad (3)$$

Where, (X, Y): window coordinate of pixel a, b and c: coefficient of parameter function If the rendering primitive is a triangle, the following simultaneous linear equation (4) is solved to calculate the foregoing coefficients a, b and c.

$$a \times X0 + b \times Y0 + c = p0$$
$$a \times X1 + b \times Y1 + c = p1$$
$$a \times X2 + b \times Y2 + c = p2 \quad (4)$$

Where, (X0, Y0), (X1, Y1), (X2, Y2): window coordinate of the vertex of the triangle p0, p1, p2: parameter value representing arbitrary attribute of the corresponding vertex In this case, the foregoing coefficients a, b and c must be calculated every kind of parameter.

According the DDA, the coefficients a and b calculated by the equation (4) are added to the initial value calculated by the equation (3), thereby obtaining parameters of neighboring pixels. The calculations described above are made, and thereby, the following processings are carried out. One is determination whether or not the pixel exists inside rendering primitive. Another is interpolation of interpolating the vertex parameter to obtain pixel parameter.

In order to effectively achieve the foregoing determination and interpolation, it is important to select processing target pixel without waste as much as possible. Thus, some methods of effectively scanning the processing target pixel have been proposed.

The most popular method is a method of scanning the processing target pixel every rectangular area calling a stamp.

The stamp is a rectangular area where pixels parallel-processed at one cycle in rasterizing are collected. For example, the stamp size is 8×8 pixels as seen from FIG. 13 disclosed in JPN. PAT. APPLN. KOAKI Publication No. 2003-423797. In this case, 64 pixels are parallel-processed for one cycle in rasterizing, and moved every cycle to scan the viewport, thereby generating pixel data.

FIG. 26-1 of JPN. PAT. APPLN. KOAKI Publication No. 2003-423797, there is shown the procedure of scanning a triangle rendering primitive using a rectangular stamp. As seen from FIG. 26-1, the stamp is moved on the line along the X-axis direction of viewport to perform one-line scanning. The line scanning is completed, and thereafter, the stamp is moved to the Y-axis direction so that it is moved along the next line. The foregoing operation is successively repeated, and thereby, pixel data is generated.

If the rendering primitive is a segment, the segment is expanded by d pixel in a minor axis direction to form a parallelogram, and thereafter, the formed parallelogram is scanned. The minor axis means a shorter axis of X-axis and Y-axis after the segment is projected; on the contrary, a longer axis calls a major axis. The foregoing "d" value is usually set to 1.0; in this case, the value is made large, and thereby, a thin segment is drawn. The parallelogram is scanned every stamp like the case of the triangle. By doing so, the following processings are carried out. One is determination whether or not the pixel exists inside the parallelogram. Another is interpolation of interpolating the vertex parameter to obtain pixel parameter.

The conventional determination and interpolation described above are carried out using the following coordinate (window coordinate). The coordinate (window coordinate) is obtained in a manner of projecting the vertex of rendering primitive in a modeled three-dimensional coordinate system on the window.

However, if the rendering primitive includes a vertex existing backwardly from the viewpoint, the vertex is not projected on the window; as a result, it does not have window coordinate. In general, the following processings are required to rasterize the foregoing rendering primitive. Specifically, as seen from FIG. 21 and FIG. 22 (of JPN. PAT. APPLN. KOAKI Publication No. 2003-423797), the rendering primitive is previously cut along neighboring clip plane. The rendering primitive is divided into part, which is projected on the viewport and part, which is not projected on there. Then, the foregoing determination and interpolation are carried out using part projected on the viewport only.

The foregoing processing of dividing the rendering primitive along the clip surface calls clipping. The clipping is complicated, and much processings are required. For this reason, dedicated hardware is frequently required; as a result, there is a possibility that the cost becomes high. For example, some rasterizing methods of requiring no clipping have been proposed as a technique of solving the foregoing problem. The method is disclosed in U.S. Pat. No. 6,504,542, Marc Olano and Trey Greer, "Triangle Scan Conversion using 2D Homogeneous Coordinates", 1997, SIGGRAPH/Eurographics Workshop In order to carry out the foregoing rasterizing methods requiring no clipping, a method of effectively searching a scan start point is newly required. The inventors have proposed a technique disclosed in JPN. PAT. APPLN. KOAKI Publication No. 2003-423797. According to the technique, a triangle projection image including a vertex existing backwardly from the viewpoint is classified using the vertex homogeneous coordinate. In accordance with the classified result, the scan start point is determined.

However, the foregoing technique is provided on the assumption that the rendering primitive is a triangle; for this reason, other rendering primitives such as segments are not taken into consideration.

BRIEF SUMMARY OF THE INVENTION

The present invention has been made in view of the foregoing circumstances. An object of the present invention is to provide rendering apparatus, which can rasterize rendering primitive according to the same method as the case where the rendering primitive is a triangle even if the rendering primitive is a segment regardless of the state whether or not one vertex of the segment exists backwardly from a viewpoint. Another object of the present invention is to provide rendering processing method and computer program product, which can rasterize rendering primitive in the same manner as above.

According to an aspect of the present invention, there is provided a rendering apparatus which comprises: a vertex input device which inputs vertex data including at least homogeneous coordinate and window coordinate relevant to two vertexes of a segment given as a rendering primitive; a edge coefficient calculator which calculates an edge coefficient of an edge function relevant to the outer side of a projection area from the vertex data, the edge coefficient being a coefficient used for determining whether or not a pixel exists inside the projection area generated when the segment is projected on the projection plane; a bounding box calculator which calculates a bounding box of the projection area on a projection plane from vertex data of at least one of two vertexes and the edge coefficient; a determiner which classifies the projection area based on a combination of the edge coefficient, and which determines scan start point and scan performing direction of the bounding box in accordance with the classification; and a traverser which scans the bounding box from the scan start point to generate pixel data.

According to another aspect of the present invention, there is provided a rendering processing method which comprises: inputting vertex data including at least homogeneous coordinate and window coordinate relevant to two vertexes of a segment given as a rendering primitive; calculating an edge coefficient of an edge function relevant to the outer side of a projection area from the vertex data, the edge coefficient being a coefficient used for determining whether or not a pixel exists inside the projection area generated when the segment is projected on the projection plane; calculating a bounding box of the projection area on the projection plane from vertex data of at least one of two vertexes and the edge coefficient; classifying the projection area based on a combination of the edge coefficient, and determining scan start point and scan performing direction of the bounding box in accordance with the classification; and scanning the bounding box from the scan start point to generate pixel data.

According to yet another aspect of the present invention, there is provided a computer program product storing a program for allowing a computer to function as a rendering apparatus, the computer program product which comprises: inputting vertex data including at least homogeneous coordinate and window coordinate relevant to two vertexes of a segment given as a rendering primitive; calculating an edge coefficient of an edge function relevant to the outer side of a projection area from the vertex data, the edge coefficient being a coefficient used for determining whether or not a pixel exists inside the projection area generated when the segment is projected on the projection plane; calculating a bounding box of the projection area on the projection plane from vertex data of at least one of two vertexes and the edge coefficient; classifying the projection area based on a combination of the edge coefficient, and determining scan start point and scan performing direction of the bounding box in accordance with the classification; and scanning the bounding box from the scan start point to generate pixel data.

BRIEF DESCRIPTION OF THE SEVERAL VIEWS OF THE DRAWING

FIG. 4 is a view showing perspective projection transformation, orthographic projection transformation and viewport transformation matrixes;

FIGS. 8A to 8H are views to explain the geometric meaning of procedures taken in FIG. 7B;

FIG. 9A and 9B are views to explain the geometric meaning of procedures taken in FIG. 7A;

FIGS. 10A to 10F are views showing three-dimensional segment projection image, that is, six parallelograms, and scan start point candidates in each parallelogram;

FIG. 11 is a view showing a scan start point and a scan direction every three-dimensional segment projection image, parallelogram expanding projection image and bounding box pattern;

FIG. 13 is a view showing the scan start point and the scan direction every three-dimensional segment projection image, parallelogram expanding projection image and bounding box pattern;

FIG. 15 is a view showing the scan start point and the scan direction every three-dimensional segment projection image, parallelogram expanding projection image and bounding box pattern;

DETAILED DESCRIPTION OF THE INVENTION

Figure 1:
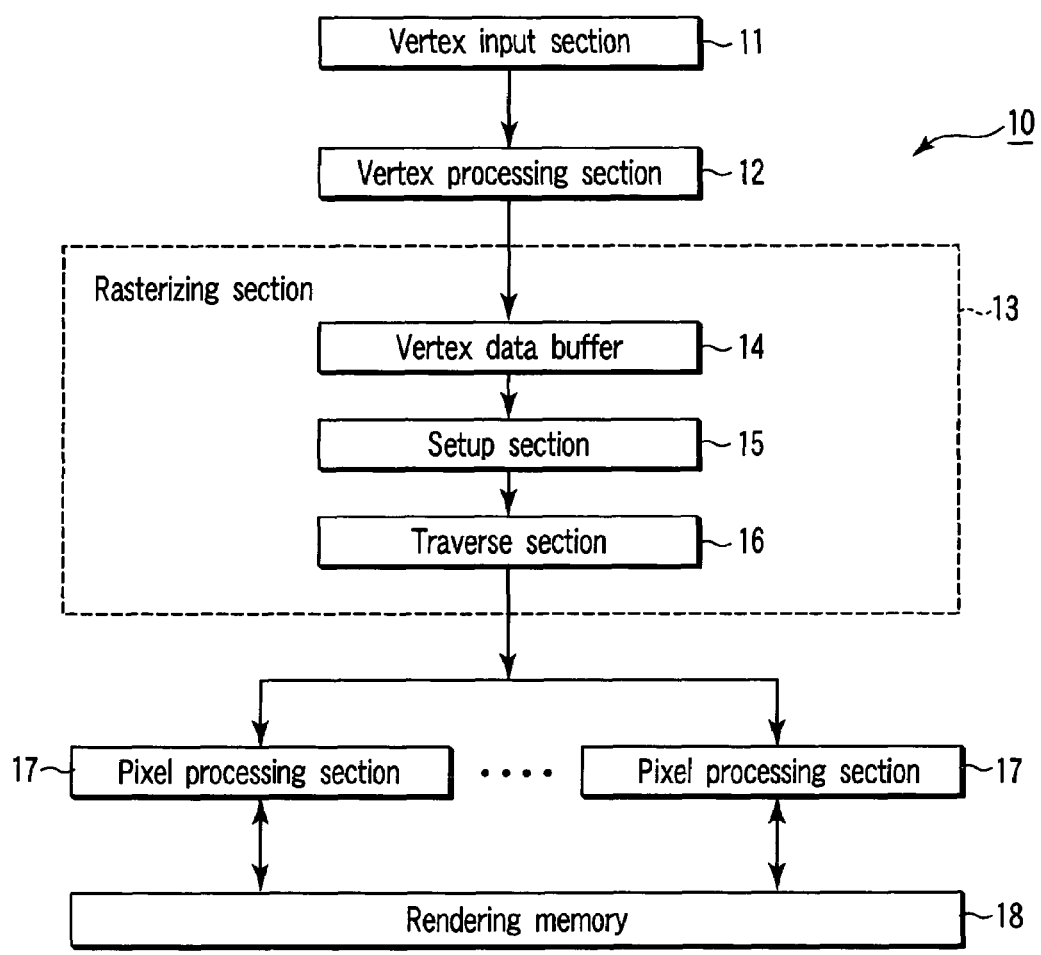
FIG. 1 is a block diagram showing the configuration of a real-time CG processor 10 according to an embodiment of the present invention.

Embodiments of the present invention will be described below with reference to the accompanying drawings. In the following description, the same reference numerals are used to designate elements having the identical function and configuration, and the overlapping explanation will be made if necessary only.

FIG. 1 is a block diagram showing the configuration of a real-time CG processor (engine) 10 according to an embodiment of the present invention. As shown in FIG. 1, the graphic processor 10 includes vertex input section 11, vertex processing section 12, rasterizing section 13, pixel processing section 17 and rendering memory 18.

The vertex input section 11 inputs vertex data of rendering primitive from a predetermined storage device.

The vertex processing section 12 makes an operation of predetermined coordinate transformation with respect to the vertex data inputted from the vertex input section 11.

The rasterizing section 13 carries out rasterizing to generate internal pixel data of rendering primitive from the vertex data processed by the vertex processing section 12. The vertex data inputted to the rasterizing section 13 (i.e., data receiving from the vertex processing section 12) is composed of vertex coordinate and vertex parameter. The vertex coordinate shows the vertex position, and the vertex parameter shows vertex attribute (e.g., color, texture, etc.). Moreover, the rasterizing section 13 carries out the following processings. One is determination whether or not a pixel exists inside rendering primitive using the vertex coordinate. Another is interpolation of interpolating the vertex parameter to calculate pixel parameter.

More specifically, the rasterizing section 13 has vertex data buffer 14, setup section 15 and traverse section 16 as seen from FIG. 1. The vertex data buffer 14 buffers vertex data inputted from the vertex input section 12. The setup section 15 acquires the vertex data of rendering primitive from the vertex data buffer, and makes the foregoing determination based on the vertex data to generate setup data required for rasterizing. The traverse section 16 carries out the foregoing interpolation using the setup data supplied from the setup section 15 to generate pixel data. The configuration and function of the setup section 15 will be described later.

The pixel processing section 17 carries out a predetermined operation with respect to the pixel data generated by the rasterizing section 13.

The rendering memory 18 stores pixel data processed by some pixel processing sections 17.

(Setup Section)

Figure 2:
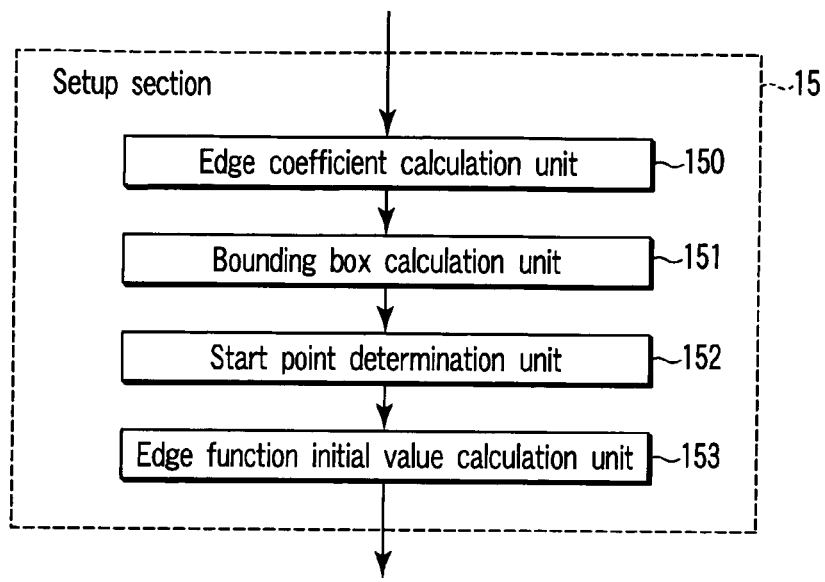
FIG. 2 is a block diagram showing the configuration of a setup section 15.

The configuration and function of the setup section 15 will be explained below. FIG. 2 is a block diagram showing the configuration of the setup section 15. As depicted in FIG. 2, the setup section 15 has edge coefficient calculation unit 150, bounding box calculation unit 151, start point determination unit 152 and edge function initial value calculation unit 153. Specifically, the edge coefficient calculation unit 150 calculates coefficient (edge coefficient) of an edge function. The bounding box calculation unit 151 calculates a bounding box of a projection image of rendering primitive. The start point determination unit 152 determines pixel scan start point and performing direction. The edge function initial value calculation unit 153 calculates an edge function value at a start pixel as a DDA initial value.

The following is an explanation about processing carried out by each section. In the following description, the case where rendering primitive is a segment is given as an object.

(Edge Calculation By Edge Coefficient Calculation Section)

Figure 3:
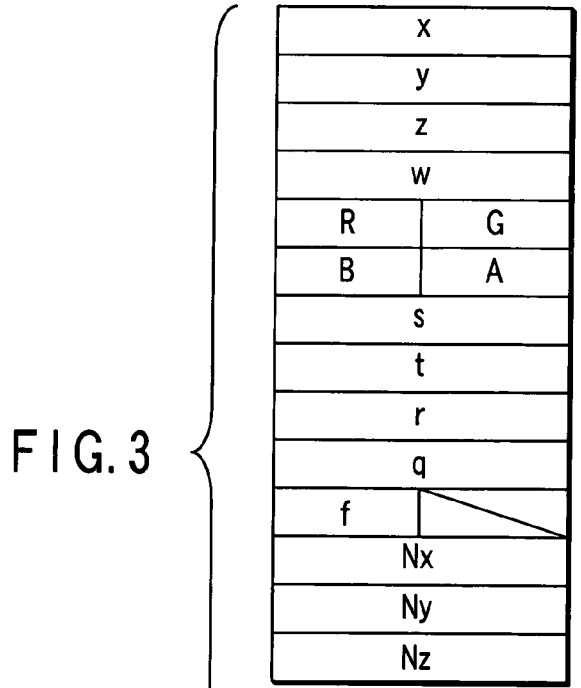
FIG. 3 is a view showing data format of vertex data in which an edge coefficient calculation unit 150 receives from a vertex data buffer 31.

The edge coefficient calculation unit 150 acquires vertex data of rendering primitive from the vertex buffer 14. The data format of the vertex data is as shown in FIG. 3. As seen from FIG. 3, the vertex data is composed of a vertex coordinate showing the vertex position and a vertex parameter showing vertex attribute.

In this case, the vertex coordinate is inputted using a homogeneous coordinate x, y, z, w, and not a window coordinate as used in the conventional case. The homogeneous coordinate is a coordinate made in a manner of multiplying arbitrary projection matrix and viewport transformation matrix shown in FIG. 4 by a coordinate (viewing coordinate) using the viewpoint as the origin. The vertex position of the rendering primitive is determined according to x, y and w components. Moreover, z component is used to determine a depth value when the rendering primitive is projected on the viewport.

If the rendering primitive has w components of all vertexes smaller than 0, the vertex exists backwardly from the viewpoint. Thus, the procedure after that may be skipped to acquire the vertex data of the next rendering primitive. The following data, that is, color, R, G, B, A, texture coordinate s, t, r, q, fog f normal vector Nx, Ny and Nz are inputted as the vertex parameter.

Then, the unit 150 calculates an edge function coefficient based on the acquired vertex data of the rendering primitive. The procedure of calculating the edge function coefficient is taken in the following manner.

In general, the edge function (linear equation) on the window coordinate system is expressed using the following equation (5).

$$a \times X + b \times Y + c = 0 \qquad (5)$$

Where, (X, Y): window coordinate of arbitrary point on viewport a, b, c: constant In this case, the foregoing symbols (a, b) means a normal vector of the edge on the window coordinate system. The relationship between the homogeneous coordinate (x, y, w) inputted to the rasterizing section 13 and the window coordinate (X, Y) is expressed using the following equation (6).

$$X = Sm \times (x/w) + W/2$$

$$Y = Sm \times (y/w) + H/2 \qquad (6)$$

Where,

Sm: half value of maximum screen size

W, H: width and height of viewport

The equation (6) is substituted for the equation (5), and thereby, the following equation (7) is obtained.

$$a \times (Sm \times (x/w) + W/2) + b \times (Sm \times (y/w) + H/2) \qquad (7)$$

When multiplying both sides of the equation (7) is multiplied by w and developing it, the following equation is obtained.

$$a \times Sm \times x + a \times (W/2) \times w + b \times Sm \times y + b(H/2) \times w + c \times w = 0$$

When arranging the above-mentioned equation, the following equation is obtained.

$$(a \times Sm) \times x + (b \times Sm) \times y + (a \times (W/2) + b \times (H/2) + c) \times w = 0$$

Here, a7, b7 and c' are replaced with the following equation (8).

$$a' = a \times Sm$$

$$b' = b \times Sm$$

$$c' = a \times (W/2) + b \times (H/2) + c \qquad (8)$$

By doing so, the following equation (9) is obtained.

$$a' \times x + b' \times y + c' \times w = 0 \qquad (9)$$

The equation (9) expresses an edge function on the homogeneous coordinate system x, y, w. The geometric meaning of the equation (9) will be described later. The following matter can be seen from the equation (8). Specifically, coefficients a, b and c of the edge function of the window coordinate system are obtained from coefficients a', b' and c' of the edge function calculated using the homogeneous coordinate system.

$$a = a'/Sm$$

$$b = b'/Sm$$

$$c = C' (a \times (W/2) + b \times (H/2)) \qquad (10)$$

In this case, transformation of the coefficient c is realized even if the window coordinates X, Y substituted for the edge function of the window coordinate system of the equation (5) are shifted by X−W/2, Y−H/2. For confirmation, when substituting X−W/2, Y−H/2 for the equation (5), the following equation is obtained.

$$a \times (X-W/2) + b \times (Y-H/2) + c$$

When arranging the above-mentioned equation, the following equation (11) is obtained.

$$a \times X + b \times Y + (c - (a \times (W/2) + b \times (H/2))) + c = 0 \qquad (11)$$

As described above, the window coordinates X, Y substituted for the edge function are shifted by X−W/2, Y−H/2, and thereby, transformation of the coefficient c of the equation (10) is realized. Therefore, transformation from the homogeneous coordinate system of the equation (10) to the window coordinate system is simplified as shown in the following equation (12).

$$a = a'/Sm$$

$$b = b'/Sm$$

$$c = C' \qquad (12)$$

Incidentally, the window coordinates X, Y substituted for the edge function are shifted by X−W/2, Y−H/2. In this case, the window coordinates X, Y of rasterized each pixel may be shifted by X+W/2, Y+H/2.

The geometric meaning of the edge function of the homogeneous coordinate system of the equation (9) and the method of calculating coefficients a', b' and c' will be described. First, the method of calculating coefficients a', b' and c' will be described below. When rewriting the equation (9) using a vector format, the following equation (13) is obtained.

$$(a', b', c') \cdot (x, y, w) = 0 \qquad (13)$$

Where, symbol "·" denotes inner (scalar) product of vector.

The equation (13) shows an equation of the plane connecting viewpoint (0, 0, 0) in the (x, y, w) space and two points on the edge. The foregoing (a', b', c') shows a normal vector on the plane. If the homogeneous coordinates at both end points of the edge are set as (x0, y0, w0), (x1, y1, w1), the normal vector (a', b', c') on the plane is calculated using the following equation (14).

$$(a', b', c') = (x0, y0, w0) \times (x1, y1, w1) \qquad (14)$$

where, symbol "×" shows outer product of vector

The normal vector (a', b', c') calculated from the homogeneous coordinate at both end points of the edge according to the equation (14) is transformed using the equation (12). By doing so, coefficients a, b and c of the edge function of the window coordinate system are calculated.

The geometric meaning of the edge function of the homogeneous coordinate system of the equation (9) will be described below. When substituting the equation (14) for the equation (13), the following equation (15) is obtained.

$$((x0, y0, w0)(x1, y1, w1)) \cdot (x, y, w) \quad (15)$$

The left side of the equation (15) is scalar triple product of vector (x0, y0, w0), (x1, y1, w1), (x, y, w). Therefore, the value is equal to six times as much as a signed volume of a triangular pyramid connecting the foregoing three points and the viewpoint (0, 0, 0).

Figure 5:
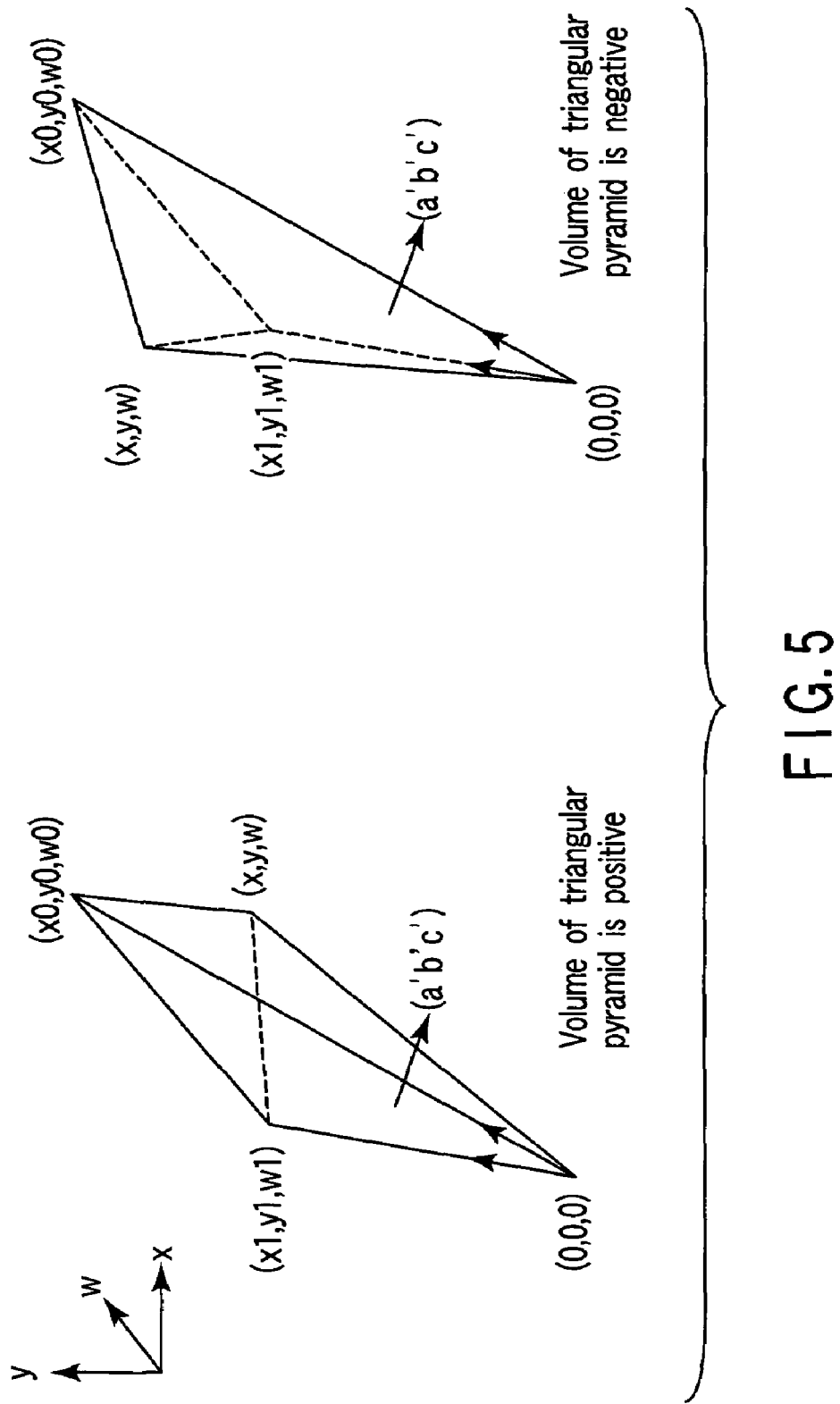
FIG. 5 is a view to explain the geometric meaning of edge function on a homogeneous coordinate system, and shows a triangular pyramid in a three-dimensional space.

FIG. 5A and FIG. 5B each show a triangular pyramid using (0, 0, 0), (x0, y0, w0), (x1, y1, w1), as the base and using (x, y, w) as a vertex. The volume sign of the triangular pyramid calculated according to the left side is as shown in FIG. 5A and FIG. 5B. Specifically, the volume sign is positive if an arbitrary point (x, y, w) exists in the same direction the normal vector (a', b', c') via the edge (case of FIG. 5A). On the other hand, the volume sign is negative if it exists in the direction reverse to above (case of FIG. 5B). Moreover, the volume sign becomes zero "0" if the arbitrary point (x, y, w) exists on the edge. Incidentally, the homogeneous coordinate system x, y, w is a left-handed system; for this reason, should be noted that the direction of the normal vector (a', b', c') becomes reverse to usual.

In other words, the edge function of the homogeneous coordinate system represents a signed volume of the triangular pyramid. The sign is determined, and thereby, a pixel on the viewport corresponding to the vertex (x, y, w) is classified into three, that is, both side areas of the edge and area on the edge.

The procedure of calculating the edge coefficient is briefly described. Namely, the unit 150 calculates coefficients a', b' and c' of the edge function of the homogeneous coordinate system from the homogeneous coordinate relevant to the vertex of the rendering primitive received from the vertex processing section 12 using the equation (14). Moreover, the unit 150 transforms the coefficient value using the equation (12), and thereby, determines coefficients a, b and c of the edge function of the window coordinate system.

The coefficients a, b and c of the edge function are used for determining whether or not window coordinate X, Y points exist inside rendering primitive in the traverse section 16 although described later.

Moreover, the edge coefficient calculation unit 150 calculates a bounding box edge function. The bounding box implies the minimum area of a circumscribed rectangular area including graphics target, that is, rendering primitive.

In general, according to segment rasterizing, there is a need of scanning a parallelogram made by expanding a segment by d pixel to the minor axis direction. In this embodiment, the edge function is used when determining whether or not a pixel exists inside two slant sides of the parallelogram. On the other hand, a parallelogram bounding box is used when determining whether or not the pixel exists inside top and bottom bases (or left and right sides) parallel with the minor axis. According to the latter determination whether or not the pixel exists inside top and bottom bases (or left and right sides) parallel with the minor axis, the slant sides are moved in parallel by predetermined amount along the minor axis. The geometric information is readily grasped. Thus, the edge coefficient calculation unit 150 calculates only edge function of two slant sides of the parallelogram without calculating the edge function of top and bottom bases (or left and right sides).

The edge coefficient calculation unit 150 calculates the edge functions of two slant sides of the parallelogram in the following manner. Namely, the sign of the edge functions of the segment calculated using the equation (14) is controlled to move a pixel to the minor axis direction by d/2 in parallel.

When the edge functions of two slant sides of the parallelogram in the homogeneous coordinate system are set as a0', b0', c0' and a1', b1', c1', the sign is expressed as shown in the following equation (16).

$$a0' = -a'$$

$$b0' = -b'$$

$$c0' = -c'$$

$$a1' = a'$$

$$b1' = b'$$

$$c1' = c'$$

In the foregoing equation (16), coefficient signs of two edge functions corresponding to slant sides are set to become mutually reverse. This is because of setting the edge function value of an area held between two slant sides to become positive.

Then, the unit 150 transforms edge functions (a0', b0', c0') and (a1', b1', c1') in the homogeneous coordinates system into edge functions (a0, b0, c0) and (a1, b1, c1) in the window coordinate system. Transformation from the homogeneous coordinates system into the window coordinate system is carried out in the following manner using the equation (12).

$$a0 = a0'/Sm$$

$$b0 = b0'/Sm$$

$$c0 = c0'$$

$$a1 = a1'/Sm$$

$$b1 = b1'/Sm$$

$$c1 = c1' \quad (17)$$

In order to move two slant sides to the minor axis direction by d/2 pixel, the unit 150 makes an addition such as the following equation (18) with respect to constant items c0, c1 of the coefficients of the edge functions.

$$C0 + = fabs(dX \times a0) + fabs(dY \times b0)$$

$$C1 + = fabs(dX \times a0) + fabs(dY \times b0) \quad (18)$$

In this case, dX=0, dY=d/2 are given when the major axis is the X-axis; on the other hand, dX=d/2, dY=0 are given when the major axis is the Y-axis. Moreover, the symbol "fabs" represents a function for returning the absolute value. According to the addition, the edge function value of an area held between two slant sides becomes positive because two slant sides are moved in parallel to the direction reverse to the normal.

The flowchart to explain the procedure of calculating the edge coefficient described above is shown in FIG. 6. In the first step S201; the coefficient of the edge function of the homogenous coordinate system of the segment is calculated using the equation (14). In step S202, coefficients of two edge functions having mutually reversed sign are calculated using the equation (16). In step S203, the coefficients of the edge functions are transformed from the homogeneous coordinate system into the window coordinate system using the equation (17). The coefficients are calculated via the homogeneous coordinate system. By doing so, even if a segment including a vertex existing backwardly from the viewpoint is given, the coefficients of the edge functions of the window coordinate system are obtained without carrying out clipping. In the final step S204, two edge functions are moved in parallel to the minor axis direction by d/2 using the equation (18). By doing so, it is possible to find edge functions of two slant sides of the parallelogram expanding the segment by d pixel in the minor axis direction.

(Bounding Box Calculation By Bounding Box Calculation Section)

The bounding box calculation of rendering primitive carried out by the by bounding box calculation section will be explained below. If the rendering primitive is a segment, the bounding box has a circumscribed rectangular shape of a parallelogram expanding a projection image of the segment to the In general, the bounding box is simply calculated by finding minimum and maximum values of X and Y components of the window coordinate on the vertexes at both sides of the segment. However, if one vertex of the segment exists backwardly from the viewpoint, the vertex is not projected on the window; as a result, it becomes infinity. For this reason, consideration for calculating the bounding box must be taken. In the rendering apparatus 10, the bounding box is calculated in the following manner.

Figure 7A:
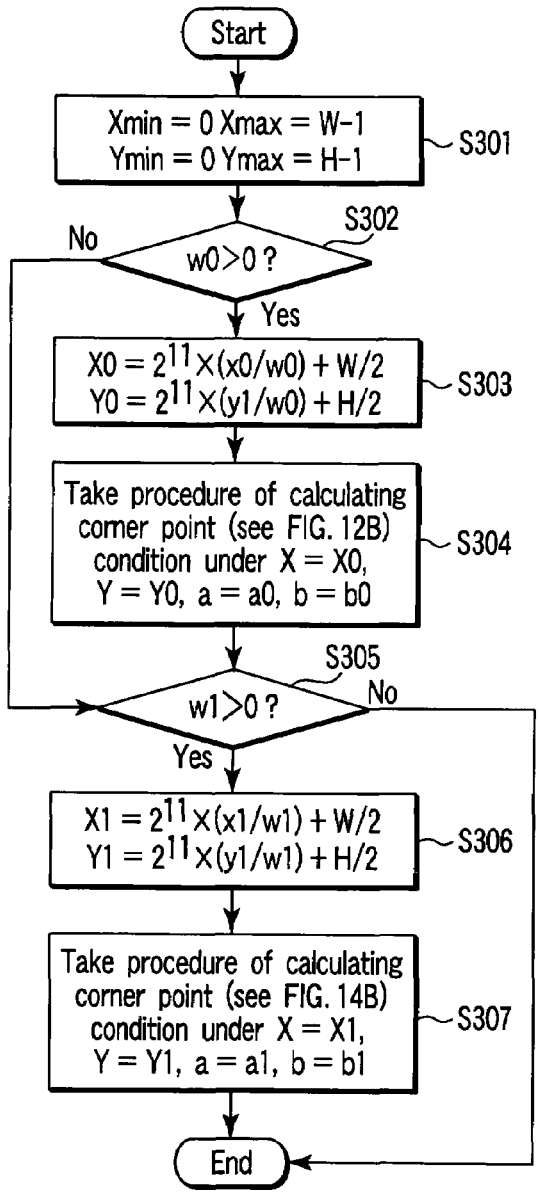
FIG. 7A and FIG. 7B are each a flowchart to explain the flow of bounding box calculation by a bounding box calculation unit 151.
Figure 7B:
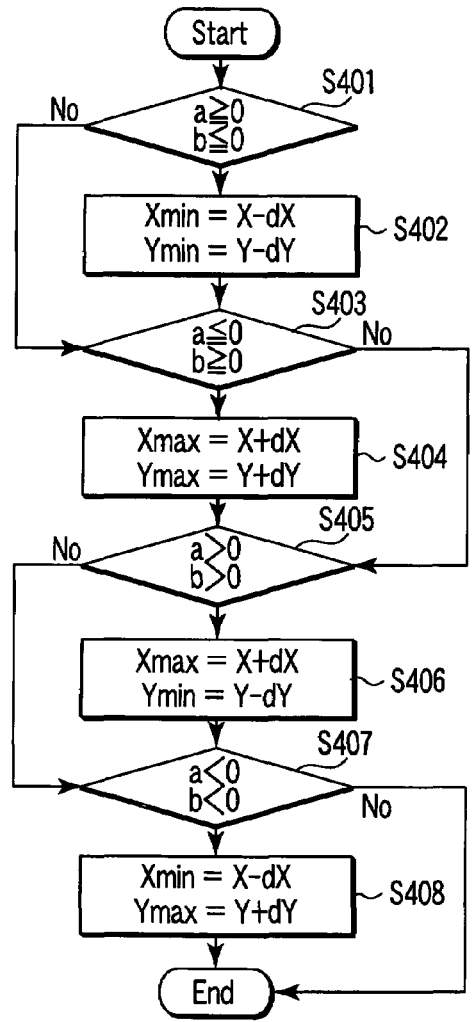
Figure 12:
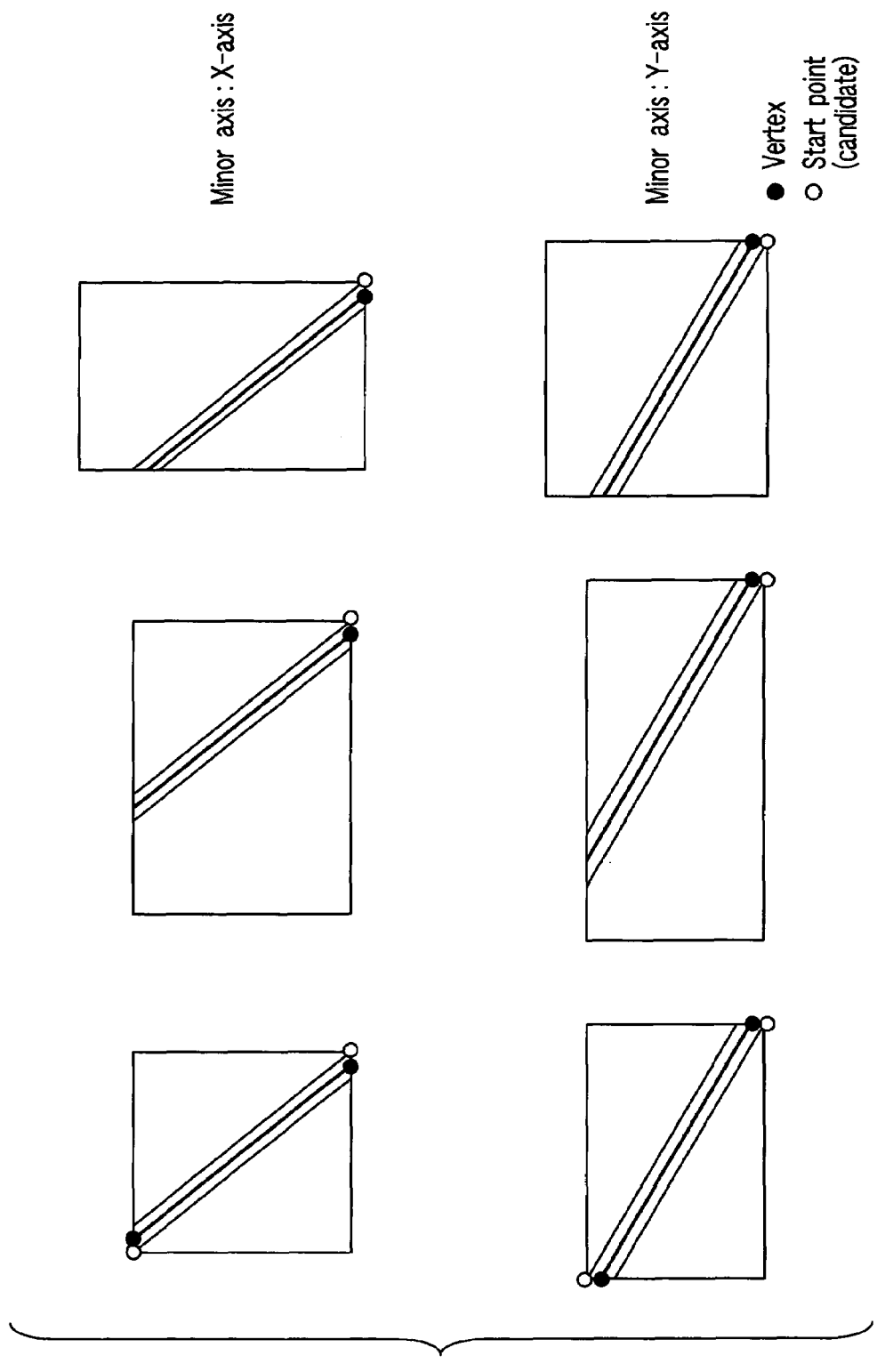
FIG. 12 is a view showing the scan start point and the scan direction every three-dimensional segment projection image, parallelogram expanding projection image and bounding box pattern.
Figure 14:
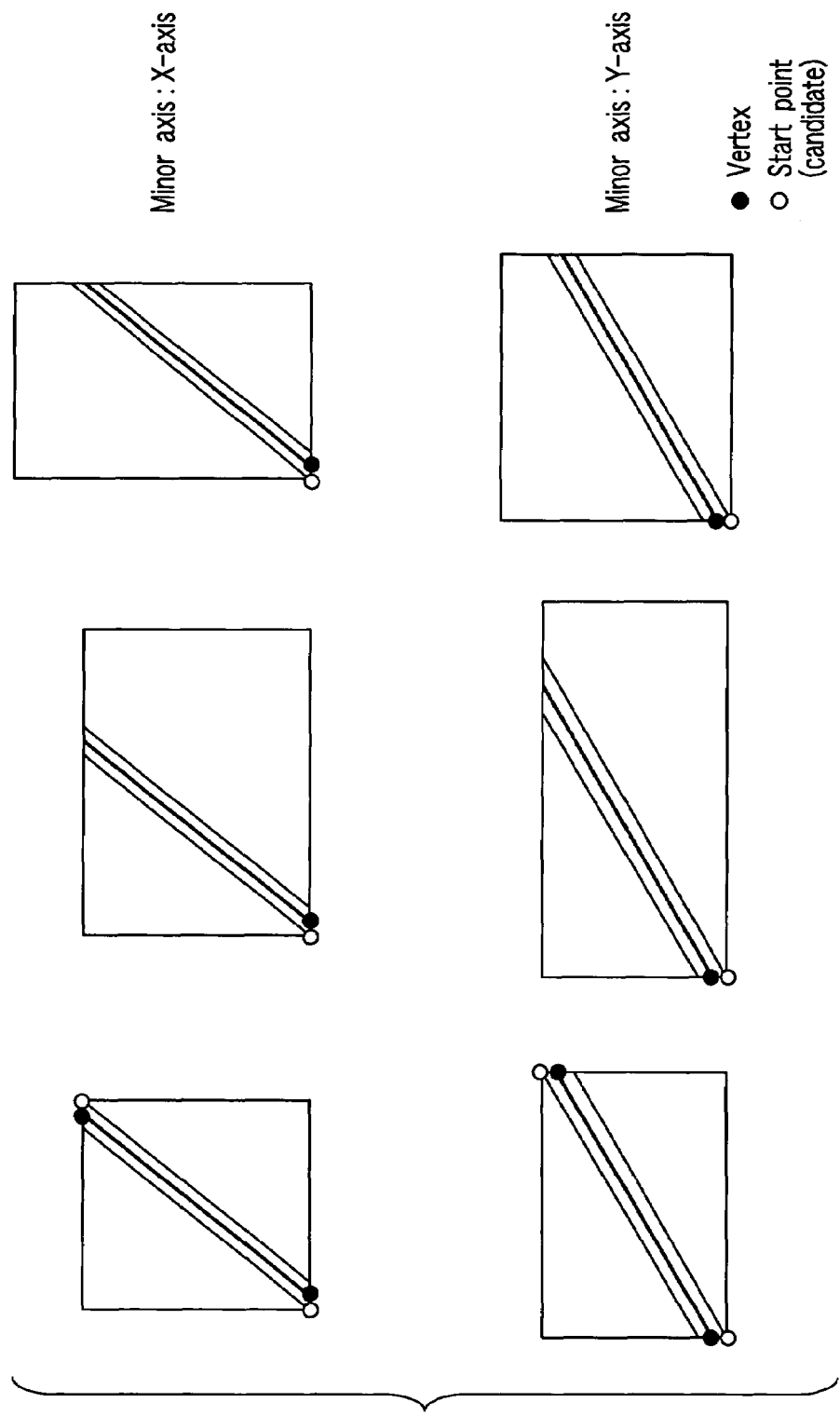
FIG. 14 is a view showing the scan start point and the scan direction every three-dimensional segment projection image, parallelogram expanding projection image and bounding box pattern.

FIG. 7A and FIG. 7B are each a flowchart to explain the procedure of calculating the bounding box. In the first step S301 of FIG. 7A; the bounding box is initialized. The bounding box is expressed using window coordinate (Xmin, Ymin) at the upper left corner point and window coordinate (Xmax, Ymax) at the lower right corner point. Here, initialization is carried out in a manner that the window coordinate (Xmin, Ymin)=(−W/2, −H/2), and the window coordinate (Xmax, Ymax)=(W/2−1, −H/2−1). In this case, W and H denote width and height of the viewport.

In step S302, it is determined whether or not w component of one vertex (x0, y0, w0) of the segment is larger than 0. If the w component is larger than 0, the flow proceeds to step S303; on the other hand, if it is less than 0, one vertex exists backwardly from the viewpoint. Thus, steps S303 and S304 are skipped, and thereafter, the flow proceeds to step S305.

In step S303, the widow coordinate (X0, Y0) is calculated using the equation (6). In step S304, the calculated widow coordinate (X0, Y0) is set as (X, Y) and coefficients a0, b0 of the edge function are set as a, b, and thereafter, the procedure of calculating the corner point is taken. According to the foregoing procedure, rendering primitive, that is, segment is classified according to combination of the gradient (coefficient) of the edge function. A value initialized in accordance with the classification is corrected, and thereby, the corner point of the bounding box is determined.

FIG. 7B is a flowchart to explain the flow of calculating-the corner point. In the first step S401 of FIG. 7B, it is determine whether or not the coefficient "a" of the edge function is more than 0 and the coefficient "b" thereof is less than 0. If the foregoing condition is satisfied, the flow proceeds to step S402. On the other hand, if the condition is not satisfied, the step S402 is skipped, and thereafter, the flow proceeds to step S403.

In step S402, the window coordinate (Xmin, Ymin) at the upper left corner of the bounding box is updated. In this case, dX and dY have the same value as the equation (18); in other words, if the major axis is the X-axis, dX=0, dY=d/2 while if it is Y-axis, dX=d/2, dY=0.

In step S403, it is determine whether or not the coefficient "a" of the edge function is less than 0 and the coefficient "b" thereof is more than 0. If the foregoing condition is satisfied, the flow proceeds to step S404. On the other hand, if the condition is not satisfied, the step S404 is skipped, and thereafter, the flow proceeds to step S405. In step S404, the window coordinate (Xmax, Ymax) at the lower right corner of the bounding box is updated.

In step S405, it is determined whether or not coefficients "a" and "b" of the edge function are larger than 0. If the foregoing condition is satisfied, the flow proceeds to step S406. On the other hand, if the condition is not satisfied, the step S406 is skipped, and thereafter, the flow proceeds to step S407. In step S406, the window coordinate (Xmax, Ymax) at the upper right corner of the bounding box is updated.

In step S407, it is determined whether or not coefficients a and b of the edge function are smaller than 0. If the foregoing condition is satisfied, the flow proceeds to step S408. On the other hand, if the condition is not satisfied, the step S408 is skipped, and thereafter, the flow ends. In step S408, the window coordinate (Xmin, Ymin) at the lower left corner The foregoing procedure of FIG. 7B is based on consideration such that the edge normal (a, b) calculated using the equations (16) and (17) is directed to the left side toward another vertex from the target vertex. The geometric meaning of the foregoing procedure will be explained below with reference to FIGS. 8A to 8H.

Specifically, steps S401 and S402 of FIG. 7B are equivalent to the procedure of the case where the vertex exists at the upper left corner point of the bounding box a shown in FIG. 8C, 8E and 8H. Steps S403 and S404 of FIG. 7B are equivalent to the procedure of the case where the vertex exists at the lower right corner point of the bounding box a shown in FIG. 8A, 8G and 8F. Likewise, steps S405 and S406 of FIG. 7B are equivalent to the procedure of the case where the vertex exists at the upper right corner point of the bounding box a shown in FIG. 8D. Steps S407 and S408 of FIG. 7B are equivalent to the procedure of the case where the vertex exists at the lower left corner point of the bounding box a shown in FIG. 8B.

If a=b=0, the vertexes at both sides of the segment coincides with each other. Thus, the procedure is interrupted after coefficient calculation of the edge function in step S401 of FIG. 7B, and then, the procedure for the next segment may be taken. Even if the procedure is not interrupted, the area of the bounding box becomes zero "0"; therefore, no drawing is carried out. Thus, the procedure taken so far is not broken.

The flowchart of FIG. 7A will be again explained. When the procedure of step S304 is completed, it is determined in the nest step S305 whether or not w component of another vertex (x1, y1, w1) of the segment is larger than 0. If the w component is larger than 0, the flow proceeds to step S306; on the other hand, if it is less than 0, another vertex (x1, y1, w1) of the segment exists backwardly from the viewpoint. Thus, steps S306 and S307 are skipped, and thereafter, the procedure ends.

In step S306, the widow coordinate (X1, Y1) is calculated using the equation (6). In step S307, the calculated widow coordinate (X1, Y1) is set as (X, Y) and coefficients a1, b1 of the edge function are set as a, b, and thereafter, the procedure of calculating the corner point of FIG. 7B is taken.

When the foregoing procedures taken in steps S301 to S307 is completed, (Xmin, Ymin) represents the window coordinate at the upper left corner point of the bounding box while (Xmax, Ymax) represents the window coordinate at the lower right corner point thereof.

The geometric meaning of the procedure of calculating the bounding box having a parallelogram according to the flow of FIG. 7A will be explained with reference to FIG. 7A, FIG. 9A and FIG. 9B. FIG. 9A is a view to explain the geometric meaning of the case where the segment exists forwardly from the viewpoint (i.e., w component of both vertexes of the segment is positive).

In step S301, the bounding box is initialized, and an initial bounding box is set.

In steps S302 to S304, the procedure of calculating the corner point of FIG. 7B is taken with respect to coefficients a0, b0 of the edge function corresponding to the window coordinate X0, Y0 of the vertex. The window coordinate (Xmax Ymax) at the lower right corner point of the bounding box is updated.

In steps S305 to S307, the procedure of calculating the corner point of FIG. 7B is taken with respect to coefficients a1, b1 of the edge function corresponding to the window coordinate X1, Y1 of another vertex. The window coordinate (Xmin Ymin) at the upper left corner point of the bounding box is updated. As a result, the upper left corner point (X1, Y1−d/2) of the bounding box and the lower right corner point (X0, Y0+d/2) thereof are calculated.

FIG. 9B is a view to explain the geometric meaning of the case where one vertex of the segment exists forwardly from the viewpoint (i.e., w component of one vertex of the segment is less than 0).

In step S301, the bounding box is initialized, and an initial bounding box is set.

In steps S302 to S304, the procedure of calculating the corner point of FIG. 7B is taken with respect to coefficients a0, b0 of the edge function corresponding to the window coordinate X0, Y0 of the vertex. The window coordinate (Xmax Ymax) at the upper right corner point of the bounding box is updated.

In steps S305, it is determined that w1<0; therefore, steps S306 and S307 are skipped. As a result, the upper left corner point (−W/2, Y0) of the bounding box and the lower right corner point (X0+d/2, H/2−1) thereof are calculated.

Thus, the bounding box initialized in step S301 is corrected into a smaller size in accordance with the side of the segment (i.e., parallelogram expanding projection image of the segment to the minor axis direction). As a result, this serves to effectively generate pixel data in the traverse section 16.

In particular, according to the method described above, if one vertex of the segment exists backwardly from the viewpoint, the initialized bounding box is divided into two areas using the following two lines. One is a straight line parallel with the minor axis passing through another vertex existing forwardly from the viewpoint. Another is a straight line parallel with the major axis passing through another vertex existing forwardly from the viewpoint. In this case, the initialized bounding box is corrected into a smaller size to delete the area including no segment in the divided two areas. By doing so, even if one vertex of the segment exists backwardly from the viewpoint, an optimized bounding box is always set.

(Start Point and Performing Direction Determination by Start Point Determination Unit 152)

The procedure of determining the scan start point and the scan performing direction by the start point determination unit 152 will be explained below.

In general, a projection image of a three-dimensional segment is classified into six parallelograms. Thus, in the rendering apparatus 10, the scan start point and the scan performing direction are determined in accordance with the classification.

FIGS. 10A to 10F are views showing three-dimensional segment projection image, that is, six parallelograms, and scan start point candidates in each parallelogram. As shown in FIG. 10A and FIG. 10B, if the parallelogram is vertical or horizontal scan may be started from any points of four corners of the parallelogram. As shown in FIG. 10C and FIG. 10D, if the parallelogram is inclined to the upper left (lower right) direction, scan is started from the upper left corner or lower right corner of the parallelogram. As shown in FIG. 10E and FIG. 10F, if the parallelogram is inclined to the upper right (lower left) direction, scan is started from the upper right corner or lower left corner of the parallelogram.

In order to know whether the three-dimensional segment inputted to the rasterizing section is projected to any of six parallelograms, the XY component of the window coordinate at both vertexes is compared in its magnitude. However, if one vertex of the segment exists backwardly from the viewpoint, the vertex is not projected on the window; for this reason, it is impossible to compare the window coordinate in its magnitude. Thus, in the rendering apparatus 10, the corner point set when calculating the bounding box is selected as the scan start point.

Specifically, in the case of FIG. 9A, the lower right corner point and the upper left corner point of the parallelogram are determined. Therefore, one of the foregoing two corner points is selected as the scan start point. In the case of FIG. 9B, the upper right corner point of the parallelogram is determined. Therefore, the foregoing point is selected as the scan start point. According to the method described above, the scan start point is determined even if one vertex of the segment exists backwardly from the viewpoint.

The scan direction is determined in accordance with the scan start point. Specifically, if the start point is the upper left corner of the parallelogram, the scan direction is set to the lower right direction. If the start point is the lower left corner of the parallelogram, the scan direction is set to the upper right direction. If the start point is the lower right corner of the parallelogram, the scan direction is set to the upper left right direction. If the start point is the upper right corner of the parallelogram, the scan direction is set to the lower left direction. The scan direction starts from the scan start point, and is set to the diagonal direction of the bounding box.

FIG. 11 to FIG. 15 is a view showing the scan start point and the scan direction every three-dimensional segment projection image, parallelogram expanding projection image and bounding box pattern. In any patterns, scan start points given as candidate (recommended) are corner points of the bounding box, that is, vertex position of parallelogram expanding projection image of the three-dimensional segment. The scan direction starts from the scan start point, and is set to the diagonal direction of the bounding box.

(Edge Function Initial Value Determination by Edge Function Initial Value Determination Unit 153)

When the scan start point and the performing direction are determined, the edge function initial value determination unit 153 calculates an edge function value in a start pixel (X, Y) as a DDA initial value using the equation (5). The unit 153 generates setup data together with already calculated edge coefficient and bounding box value.

Figure 16:
FIG. 16 is a view showing setup data generated in an edge function initial value determination unit 153.

FIG. 16 shows the setup data generated by the edge function initial value determination unit 153. The traverse section 16 connected to the after-stage of the setup section 15 inputs setup data from the setup section 15. Then, the traverse section 16 carries out DDA of successively adding coefficients of the edge function to the initial value to determine an edge function value of each pixel.

(Procedure by Setup Section 13)

Figure 17:
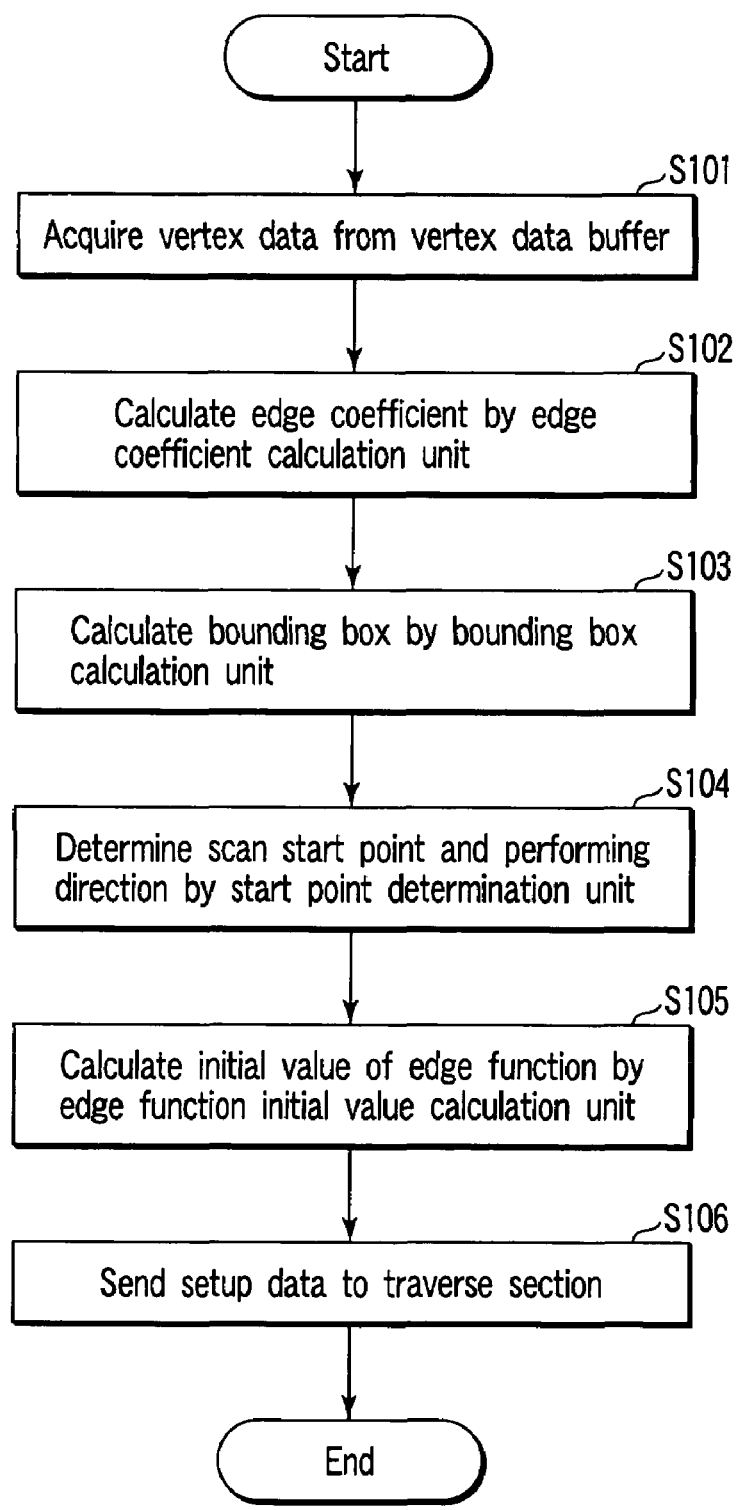
FIG. 17 is a flowchart to explain the operation flow by a setup section 13.

FIG. 17 is a flowchart to explain the operation flow of the setup section 13. Referring now to FIG. 17, the procedure taken by the setup section 13 will be described below. The details of the procedure taken in each step are as already described.

As depicted in FIG. 17, the setup section 13 acquires vertex data having the format shown in FIG. 3 from the vertex data buffer 14 (step S101).

Figure 6:
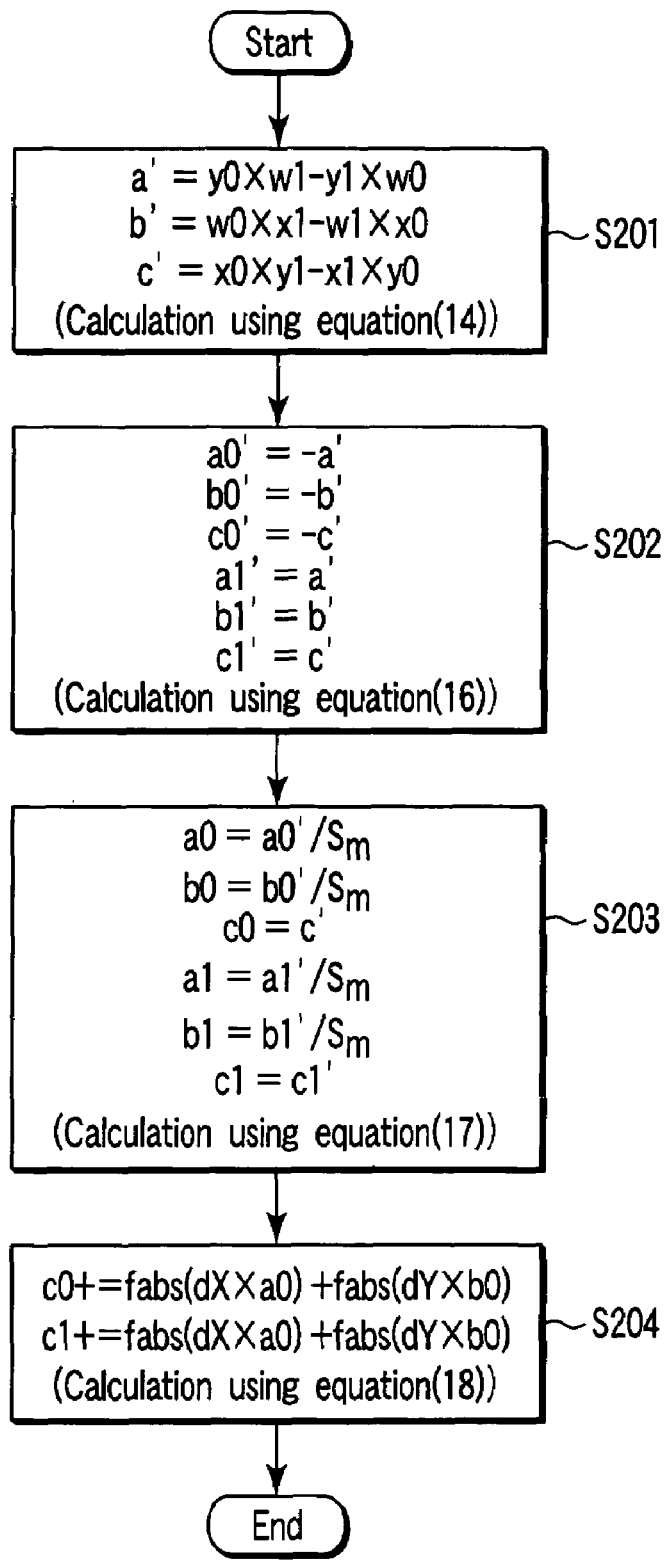
FIG. 6 is a flowchart to explain the flow of edge calculation by the edge coefficient calculation unit 150.

The edge coefficient calculation unit 150 calculates an edge coefficient of the homogeneous coordinate system with respect to rendering primitive, that is, segment according to the procedure shown in FIG. 6. Based on the foregoing coefficient, the unit 150 calculates window coordinate of the corresponding edge coefficient and edge functions of two slant sides of the parallelogram expanding the segment by d pixel to the minor axis direction (step S102).

The bounding box calculation unit 151 calculates a bounding box having a parallelogram according to the procedure shown in FIG. 7A and FIG. 7B (step S103). The unit 151 calculates a parallelogram bounding box expanding the segment by d pixel to the minor axis direction based on the obtained edge coefficient of segment and edge functions of two slant sides of the parallelogram.

The start point determination unit 152 classifies the parallelogram into six kinds. Thereafter, the unit 152 determines scan start point and performing direction in accordance with the classification in the manner described in FIG. 10 to FIG. 15 (step S104).

The edge function initial value determination unit 153 calculates an edge function value in a start pixel (X, Y) as a DDA initial value using the equation (5). Thereafter, the unit 153 generates setup data together with already calculated edge coefficient and bounding box value. The setup data thus generated is sent to the traverse section 16 (step S105).

According to the configuration described above, the following effects can be obtained.

The rendering apparatus of this embodiment calculates the edge coefficient of the homogeneous coordinate system, and transforms it to calculate the edge coefficient of the window coordinate system. Therefore, even if rendering primitive is a segment, it is possible to rasterize rendering primitive according to the same method as the case where the rendering primitive is a triangle regardless of the state whether or not one vertex of the segment exists backwardly from a viewpoint without clipping.

If at least part of the segment exists forwardly from the viewpoint, the rendering apparatus of this embodiment calculates the bounding box circumscribing the projection image of the segment using the window coordinate of at least one of both vertexes of the segment. Therefore, even if one vertex of the segment exists backwardly from the viewpoint, the bounding box is set using the same method. Moreover, the obtained bounding box is reduced depending on the projection image size of the segment and the state whether or not one end of the segment exists backwardly from the viewpoint. Therefore, the bounding box thus set is made small as much as possible, and thus, rasterizing is effectively achieved.

The rendering apparatus of this embodiment classifies the projection image of the segment based on the combination of edge coefficient. Then, the rendering apparatus determines scan start point and scan performing direction of the bounding box in accordance with the foregoing classification. Therefore, even if rendering primitive is a segment, it is possible to effectively determine the scan start point and the scan performing direction according to the same method as the case where the rendering primitive is a triangle regardless of the state whether or not one vertex of the segment exists backwardly from a viewpoint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rendering apparatus comprising:
   a vertex input device which inputs vertex data including at least a homogeneous coordinate and window coordinate relevant to two vertexes of a segment given as a rendering primitive;
   an edge coefficient calculator which calculates an edge coefficient of an edge function relevant to the outer side of a projection area from the vertex data, the edge coefficient being a coefficient used for determining whether a pixel exists inside the projection area generated when the segment is projected on the projection plane;
   a bounding box calculator which calculates a bounding box of the projection area on a projection plane from vertex data of at least one of two vertexes and the edge coefficient;
   a determiner which classifies the projection area based on a combination of the edge coefficient, and which determines a scan start point and a scan performing direction of the bounding box in accordance with the classification; and
   a traverser which scans the bounding box from the scan start point to generate pixel data,
   wherein the edge coefficient calculator calculates the edge coefficient based on the homogeneous coordinates of two vertexes, and
   the bounding box calculator determines whether at least part of the segment exists forwardly from the reference viewpoint based on the homogeneous coordinates of two vertexes, and if it is determined that part of the segment exists forwardly from a reference viewpoint, calculates a bounding box of a projection image of the segment using at least one window coordinate of two vertexes.

2. The rendering apparatus according to claim 1, wherein the bounding box calculator
   determines whether one vertex of the segment exists backwardly from the reference viewpoint,
   divides an initialized bounding box into a first area including the segment and a second area including no segment by using a first straight line and a second straight line if it is determined that one vertex of the segment exists backwardly from the reference viewpoint, the first straight line being parallel with a vertical axis of a window coordinate system passing through another vertex existing forwardly from the reference viewpoint, and the second straight line parallel with a horizontal axis of the window coordinate system passing through another vertex, and
   makes smaller the initialized bounding box so that the second area is deleted.

3. The rendering apparatus according to claim 1, wherein the determiner determines a scan start point which is a corner of the bounding box and any of the vertexes of the projection area, based on the classification, and which determines a direction from the scan start point to an inside of the projection area as a scan direction.

4. The apparatus according to claim 1, wherein the edge function value in the pixel corresponding to the scan start point is used as an initial value, and
   the edge coefficient is added to the initial value toward the scan performing direction to generate the pixel data.

5. A rendering apparatus, comprising:
a vertex input device which inputs vertex data including at least a homogeneous coordinate and window coordinate relevant to two vertexes of a segment given as a rendering primitive;
an edge coefficient calculator which calculates an edge coefficient of an edge function relevant to the outer side of a projection area from the vertex data, the edge coefficient being a coefficient used for determining whether a pixel exists inside the projection area generated when the segment is projected on the projection plane;
a bounding box calculator which calculates a bounding box of the projection area on a projection plane from vertex data of at least one of two vertexes and the edge coefficient;
a determiner which classifies the projection area based on a combination of the edge coefficient, and which determines a scan start point and a scan performing direction of the bounding box in accordance with the classification; and
a traverser which scans the bounding box from the scan start point to generate pixel data,
wherein the projection area is a parallelogram generated in a manner of moving a projection image on the projection plane of the segment in parallel to a minor axis direction, which is an axis having a shorter length when the segment is projected on vertical and horizontal axes of the projection plane.

6. The apparatus according to claim 5, wherein the edge function value in the pixel corresponding to the scan start point is used as an initial value, and
the edge coefficient is added to the initial value toward the scan performing direction to generate the pixel data.

7. A rendering processing method comprising:
inputting vertex data including at least a homogeneous coordinate and a window coordinate relevant to two vertexes of a segment given as a rendering primitive;
calculating an edge coefficient of an edge function relevant to the outer side of a projection area from the vertex data, the edge coefficient being a coefficient used for determining whether a pixel exists inside the projection area generated when the segment is projected on the projection plane;
calculating a bounding box of the projection area on the projection plane from vertex data of at least one of two vertexes and the edge coefficient;
classifying the projection area based on a combination of the edge coefficient;
determining a scan start point and a scan performing direction of the bounding box in accordance with the classification;
scanning the bounding box from the scan start point to generate pixel data; and
storing the pixel data in a memory,
wherein the calculating further calculates the edge coefficient based on the homogeneous coordinates of two vertexes, and the method further comprises
determining whether at least part of the segment exists forwardly from a reference viewpoint based on the homogeneous coordinates of two vertexes, and
calculating a bounding box of a projection image of the segment using at least one window coordinate of two vertexes if it is determined that part of the segment exists forwardly from the reference viewpoint.

8. The rendering processing method according to claim 7, further comprising:
determining whether one vertex of the segment exists backwardly from the reference viewpoint;
dividing an initialized bounding box into a first area including the segment and a second area including no segment by using a first straight line and a second straight line if it is determined that one vertex of the segment exists backwardly from the reference viewpoint, the first straight line being parallel with a vertical axis of a window coordinate system passing through another vertex existing forwardly from the reference viewpoint, and the second straight line parallel with a horizontal axis of the window coordinate system passing through another vertex; and
making smaller the initialized bounding box so that the second area is deleted.

9. The rendering processing method according to claim 7, further comprising:
determining a scan start point which is a corner of the bounding box and any of the vertexes of the projection area, based on the classification; and
determining a direction from the scan start point to an inside of the projection area as a scan direction.

10. The rendering process method according to claim 7, wherein the edge function value in the pixel corresponding to the scan start point is used as an initial value, and
the edge coefficient is added to the initial value toward the scan performing direction to generate the pixel data.

11. A rendering processing method comprising:
inputting vertex data including at least a homogeneous coordinate and a window coordinate relevant to two vertexes of a segment given as a rendering primitive;
calculating an edge coefficient of an edge function relevant to the outer side of a projection area from the vertex data, the edge coefficient being a coefficient used for determining whether a pixel exists inside the projection area generated when the segment is projected on the projection plane;
calculating a bounding box of the projection area on the projection plane from vertex data of at least one of two vertexes and the edge coefficient;
classifying the projection area based on a combination of the edge coefficient;
determining a scan start point and a scan performing direction of the bounding box in accordance with the classification;
scanning the bounding box from the scan start point to generate pixel data; and
storing the pixel data in a memory,
wherein the projection area is a parallelogram generated in a manner of moving a projection image on the projection plane of the segment in parallel to a minor axis direction, which is an axis having a shorter length when the segment is projected on vertical and horizontal axes of the projection plane.

12. The rendering process method according to claim 11, wherein the edge function value in the pixel corresponding to the scan start point is used as an initial value, and
the edge coefficient is added to the initial value toward the scan performing direction to generate the pixel data.

13. A computer readable medium storing computer executable instructions, which when executed by a computer, cause the computer to perform steps comprising:
inputting vertex data including at least a homogeneous coordinate and window coordinate relevant to two vertexes of a segment given as a rendering primitive;
calculating an edge coefficient of an edge function relevant to the outer side of a projection area from the vertex data, the edge coefficient being a coefficient used for determining whether a pixel exists inside the projection area generated when the segment is projected on the projection plane;

calculating a bounding box of the projection area on the projection plane from vertex data of at least one of two vertexes and the edge coefficient;

classifying the projection area based on a combination of the edge coefficient;

determining a scan start point and a scan performing direction of the bounding box in accordance with the classification;

scanning the bounding box from the scan start point to generate pixel data; and storing the pixel data in a memory, wherein the calculating further calculates the edge coefficient based on the homogeneous coordinates of two vertexes, and the steps executed by the computer further comprise determining whether at least part of the segment exists forwardly from a reference viewpoint based on the homogeneous coordinates of two vertexes, and calculating a bounding box of a projection image of the segment using at least one window coordinate of two vertexes if it is determined that part of the segment exists forwardly from the reference viewpoint.

14. The computer readable medium according to claim 13, storing further computer executable instructions causing the computer to perform steps comprising:

determining whether one vertex of the segment exists backwardly from the reference viewpoint;

dividing an initialized bounding box into a first area including the segment and a second area including no segment by using a first straight line and a second straight line if it is determined that one vertex of the segment exists backwardly from the reference viewpoint, the first straight line being parallel with a vertical axis of a window coordinate system passing through another vertex existing forwardly from the reference viewpoint, and the second straight line parallel with a horizontal axis of the window coordinate system passing through another vertex; and making smaller the initialized bounding box so that the second area is deleted.

15. The computer readable medium according to claim 13, storing further computer executable instructions causing the computer to perform steps comprising:

determining a scan start point which is a corner of the bounding box and any of the vertexes of the projection area, based on the classification; and determining a direction from the scan start point to an inside of the projection area as a scan direction.

16. The computer readable medium according to claim 13, wherein the edge function value in the pixel corresponding to the scan start point is used as an initial value, and the edge coefficient is added to the initial value toward the scan performing direction to generate the pixel data.

17. A computer readable medium having computer executable instructions causing a computer to perform steps comprising:

inputting vertex data including at least a homogeneous coordinate and window coordinate relevant to two vertexes of a segment given as a rendering primitive;

calculating an edge coefficient of an edge function relevant to the outer side of a projection area from the vertex data, the edge coefficient being a coefficient used for determining whether a pixel exists inside the projection area generated when the segment is projected on the projection plane;

calculating a bounding box of the projection area on the projection plane from vertex data of at least one of two vertexes and the edge coefficient;

classifying the projection area based on a combination of the edge coefficient;

determining a scan start point and a scan performing direction of the bounding box in accordance with the classification;

scanning the bounding box from the scan start point to generate pixel data; and storing the pixel data in a memory, wherein the projection area is a parallelogram generated in a manner of moving a projection image on the projection plane of the segment in parallel to a minor axis direction, which is an axis having a shorter length when the segment is projected on vertical and horizontal axes of the projection plane.

18. The computer readable medium according to claim 17, wherein the edge function value in the pixel corresponding to the scan start point is used as an initial value, and the edge coefficient is added to the initial value toward the scan performing direction to generate the pixel data.

* * * * *